July 5, 1966 G. A. WILKINSON, JR 3,259,037

ORDERED RECORD FILE AND THE METHOD OF MAKING

Filed June 11, 1963

GILES A. WILKINSON, JR.
INVENTOR.

BY R. Frank Smith
Paul P. Holmes
ATTORNEYS

United States Patent Office
3,259,037
Patented July 5, 1966

3,259,037
ORDERED RECORD FILE AND THE METHOD OF MAKING

Giles A. Wilkinson, Jr., Rochester, N.Y., assignor to Eastman Kodak Company, Rochester, N.Y., a corporation of New Jersey Filed June 11, 1963, Ser. No. 287,053
Claims priority, application Great Britain, Feb. 21, 1963, 7,103/63
8 Claims. (Cl. 95—1)

This invention relates to the recording and indexing of information on a recording medium. More particularly, the invention relates to a method of preparing an ordered record file from recorded information and index patterns, and to the ordered record file so produced.

As used in this specification, an ordered record file means a compilation of related information arranged in a predetermined manner to facilitate the filing and locating of information in the file. The ordered record file of the present invention comprises in one of its aspects a sheet on which appears a compilation of related information, indexed and arranged in a predetermined order in a plurality of rows in each of two substantially perpendicular directions to facilitate examining the integrity of the file and locating any given information thereon.

It is old in the art to prepare a record file from a number of existing documents or records by recording the images of the records on a strip of material. It is also known to place index or code patterns along the strip to identify different portions of the recording strip. However, observation of the record file so prepared is generally limited to viewing in a strip film reader. This has the time-consuming disadvantage of requiring, when it is desired to view an image anywhere on the strip other than immediately at the leading end, that all the preceding footage of the strip be run through the strip film reader. In addition, such a reader can cause considerable wear on the strip and thereby shorten its useful life, and, if the recording strip is broken or severed, part of the record file can be lost without any indication that its integrity should be examined. The present invention is an improvement over the preparation of the record file above discussed and overcomes these named advantages by disclosing a simple and inexpensive means for preparing a record file in sheet form without requiring an oversize platen on the recording apparatus. The invention comprises in one of its more specific aspects, recording on a strip of material separately distinguishable index patterns and the records forming the file, severing the strip at pre-selected points along the length of the strip, and arranging the severed segments in sheet form without losing the order of recording or the integrity of the file. Such a record file in sheet form, containing on one sheet all or part of the file under a given subject heading, can be more easily handled and stored than the strip file previously known in the art.

Although various well known recording apparatus can be employed in practicing the invention, it was originally devised for use in conjunction with photographic apparatus such as a microfilmer. For example, the records bearing the information to be included in the file, and the separately distinct index patterns, are moved in a predetermined order through the photographing station of a microfilmer and the images are recorded on a microfilm strip. The microfilm strip is cut into segments, either before or after it has been processed to produce visible images, and these segments are assembled and rearranged in a side by side relationship in the order indicated by the index patterns recorded on the severed segments. This side by side arranging of the segments composes a record file in sheet form, and the segments bearing the micro-images thus positioned in sheet form can be attached together by any one of many well known ways. The record file so prepared in one or more sheets can be conveniently viewed in a sheet film reader.

It should be understood, however, that the invention is not limited to a visual record file such as that produced with photographic apparatus, and the description of the invention with reference to such visual record file and photographic apparatus is merely for purposes of illustration. The record file could comprise a sound recording or sound track of a body of information, properly indexed with distinguishable audible signal in accordance with the invention.

One object of the present invention is to provide an improved method for arranging and indexing information.

Another object of the present invention is to provide a method for arranging and recording related information to form a record file in which identification of the content of the file is facilitated.

Still another object of the present invention is to provide a method for preparing from documented information an ordered record file which incorporates means for ascertaining the integrity of the file.

Another object of the present invention is to provide a novel and ordered record file of related information.

Yet another object of the present invention is to provide a novel and ordered record file which facilitates storing, handling and using the information included therein.

Still other objects and advantages of the present invention will become readily apparent to those skilled in the art from the following description, with reference to the accompanying drawings in which like characters denote like parts.

In order that the invention may be more readily understood, one form thereof will now be described with reference to the accompanying drawings, in which.

According to the present invention, a method for preparing an ordered record file comprises recording on a given length of recording strip 11 a subject heading or indicating means 12 which serves to identify or describe the subject matter of the information to be recorded in the file. Such a heading could be provided by recording on the strip a descriptive word or code name in letters sufficiently large to be readable, preferably without magnification.

Figures 1, 2, 5:
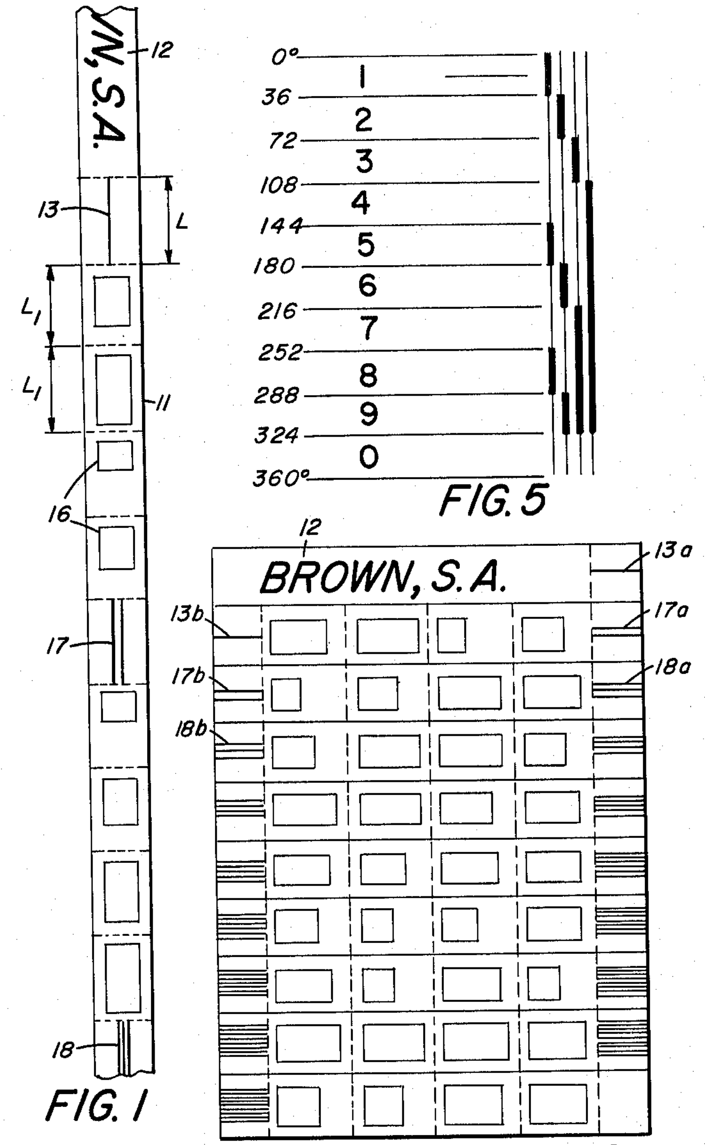
FIG. 1 shows a strip of recording material bearing micro-images arranged on the strip in accordance with the present invention.
FIG. 2 shows a record file prepared in accordance with the invention, assembled and arranged from the recording strip shown in FIG. 1.
FIG. 5 shows a scale for reading the index patterns shown in FIG. 4.
Figure 4:
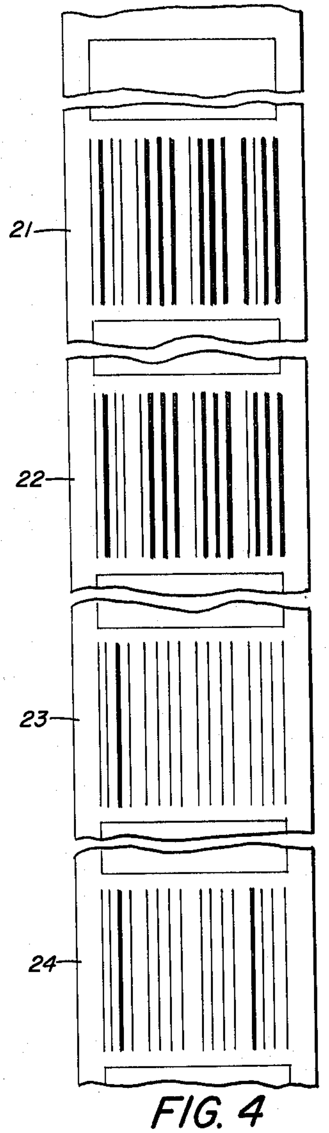
FIG. 4 shows a series of index patterns utilizing a binary code system.

Following the recording of the subject heading, a code or index pattern 13 is recorded on a predetermined length L of the recording strip. Additional separately distinguishable index patterns are recorded at spaced intervals along the strip, as hereinafter described. The index patterns can be in any of a variety of different forms, such as an unrelated system of patterns, or a progressive series of markings such as shown in FIG. 4 and which are described in detail hereinafter. For present purposes of illustration it could be a simple system of line patterns running lengthwise on the recording strip, as shown in FIG. 1, with an additional line added each time a pattern is recorded. These lines could be produced by exposing at selected intervals along the recording strip a pattern of lights while the strip is moving through a recording station, or by merely passing through the recording apparatus at the selected spaced intervals a sheet bearing the index pattern.

Figure 3:
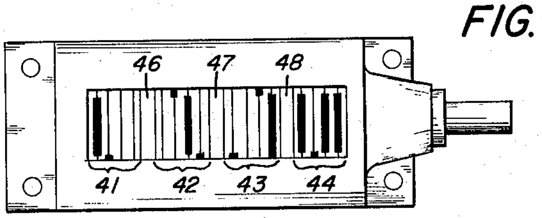
FIG. 3 shows a device for producing index patterns on the recording strip.

Still another means for accomplishing this step would be to provide, in the photographing station of recording apparatus such as a continuous microfilmer, a mechanical device which produces the desired patterns, and to record on the strip the images of these patterns where required. Such a device is shown in FIG. 3, and utilizes a binary system of index patterns whereby it would be possible to record and index a large number of records without duplicating any given pattern. Although the main purpose of such a device as it is related to the present invention is to produce separately distinguishable patterns, and not to identify particular records, such a pattern producing device has the added advantage of producing a progressive system of patterns which can be utilized to rapidly locate a segment of the record file.

Although many variations of such a pattern producing device will become apparent from the following discussion, the device shown is comprised of a number of wheels, a total of four line wheels 41, 42, 43 and 44, and three spacer wheels 46, 47, and 48, being shown. The wheels are geared to move together similar to the wheels of a counter but with the line patterns replacing the usual numerals. Each wheel bears around its periphery the system of wide and narrow lines which is shown in a flattened plane in FIG. 5. The periphery of each wheel is divided into ten separate arcs of equal length, and each length can alternatively be moved into view in the photographing station. For example, as shown in FIG. 5, a wide line and three narrow lines are carried on the first 36° arc, and a narrow line, a wide line and two more narrow lines on the next 36° arc. This binary system continues around the periphery of each wheel, as illustrated in FIG. 5. Since the system uses a progressive series of lines, a numerical value which is readily matched, and generally more familiar to the user, can be assigned each arc. For example, the combination of lines on the periphery of the wheel from 0° to 36° could represent the number one and from 36° to 72° the number two. With the simple device shown, comprised of only four line wheels, it is possible to display 10,000 code patterns without duplication. A recording strip bearing four code patterns produced by this device is shown in FIG. 4, the major parts of the strip between the patterns being cut away to better illustrate the code system. The characters 21 through 24 represent the numbers 2998 through 3001, respectively. As previously mentioned, such a numerical system could be used to facilitate locating given segments of the record file.

After the code pattern 13 has been recorded on a given length of recording strip L, the information to be included in the file is recorded on the strip 11. The records forming the file are recorded in groups of preselected number such that a different group is recorded between each of the spaced patterns. For reasons hereinafter pointed out, it is preferred that each group be comprised of an equal number of records, such as illustrated in FIG. 1 and FIG. 2 by groups containing four images, and that each record image 16 be carried on a uniform length of recording strip $L_1$ althougth these are not essential steps in practicing the present invention. By exposing a uniform length of strip for each record in the file, such as by advancing the film strip in a microfilmer a uniform length for each exposure to be made, with this length adjusted to the size of the largest document or record to be recorded, each record image will appear on an equal length of strip regardless of the size of the individual records. In addition, each equal sized group of records will take up an equal total length of the recording strip so that the index patterns recorded between the groups will be spaced at uniform intervals along the strip.

Immediately after the first group of record images has been recorded, a separately distinguishable code pattern 17 is recorded on a predetermined length of the recording strip. Another separately distinguishable pattern 18 is recorded after the following group of records. The separately distinguishable pattern recorded between each of the separate groups of documents is an important feature of the ordered record file prepared by practicing the present invention, and means that once a pattern has been recorded in a given file it will not be repeated within that same file. If a mechanical device or a pattern of lights is used to make the pattern in an apparatus such as a microfilmer, each individual code pattern can be prepared for recording by manually or automatically changing the previous pattern while recording the group of documents to immediately precede the new pattern on the recording strip.

The sequence of steps comprising recording a group of documents, recording a separately distinguishable pattern, and recording another group of documents, continues until all information to be included in the record file under a given heading is reproduced on the recording strip. Thus, the result of the above-disclosed novel method might be a strip of microfilm having recorded thereon a descriptive subject heading, uniformly sized groups of prearranged record images, a code pattern between the heading and first group of record images, and separately distinguishable patterns at uniformly spaced intervals along the length of strip and between each of the groups of record images.

After recording all information to be included in a complete record file, which file may be comprised of information under more than one title or heading, the recording strip should be processed to provide permanent visible images if the file is prepared on a photosensitive material. However, such processing would not be necessary if the file is comprised of a sound recording, such as on magnetic tape. It should also be noted that processing, if it is necessary, can be done between other steps in the method of the present invention without departing from the scope of the invention.

Following the recording of all images to be carried on the strip of material utilized in the present invention, the strip is severed into segments, preferably of equal length with each point of severance located intermediate the ends of uniformly spaced patterns so that recognizable complementary portions of a severed pattern are carried by two distinct segments and each segment is of substantially equal length. The distinct severed segments are assembled and arranged in a side by side relationship, as illustrated in FIG. 2, such that the portion of a separately distinguishable pattern appearing on the end of one segment is complementary to the portion of the pattern appearing at the opposite end of the contiguous segment. For example, in FIG. 2, pattern **13*a* is complementary to 13*b*, and 17*a* is the complement of 17*b***. If a segment is missing it is immediately apparent to the person rearranging the segments because of the discontinuity of the parts of patterns carried on distinct segments. Thus, the order of recording and integrity of the rearranged record file can be quickly determined by matching the successive code patterns of the side by side segments of recording strip.

In order to improve the ease of handling and viewing this novel record file, the body of side by side segments can be attached together by means such as cellophane tape, or adhesive, or it can be mounted on transparent sheets or even opaque sheets if the sheets will be viewed in a reflectance-type viewer, or it can be reproduced in sheet form such as by printing on sheet film. However, it should be understood that such joining, mounting or reproducing it is not necessary in preparing the novel record file herein disclosed.

Because the recording strip preferably advances a uniform length for each record image recorded, and because a uniform number of record image preferably appears on the recording strip between the spaced code patterns the side by side positioning of the severed segments results in the record images being located in a plurality of rows in each of two substantially perpendicular directions in the newly assembled record file. This presents a body of related information in a manner which aids the rapid scanning of the file to determine order and integrity. In addition, it presents a file wherein each of the rows in the two directions can be further coded to expedite locating a particular record so that the information it contains can be utilized. For instance the rows in one direction could be designated Row A, B, C, and the rows in the other direction designated Row 1, 2, 3. In an institution such as a university, which might have a one sheet record file for each student, record A–1 could be the standard location for an entrance examination, and record D–4 the location of the student's transcript.

The invention has been described in detail with particular reference to preferred embodiments thereof, but it will be understood that variations and modifications can be effected within the spirit and scope of the invention as described hereinabove and as defined in the appended claims.

Having now particularly described my invention, what I desire to secure by Letters Patent of the United States and what I claim is:

1. A method for preparing an ordered file which comprises:
- (a) recording on a strip of material
  - (1) a plurality of separately distinguishable patterns, each pattern being longitudinally spaced along the strip from the preceding pattern and identifying the portion of the strip on which it is recorded, and between the spaced patterns,
  - (2) selected groups of information which are to form the file; and
- (b) severing the strip through said patterns between each of said groups in a manner such that complementary parts of each severed pattern are carried by distinct segments of said strip;
- (c) whereby order and integrity of the severed segments is indicated by the complementary parts of patterns carried by said segments.

2. The method in accordance with claim 1 and further comprising:
- (a) recording on a length of said strip of material indicating means for identifying said information;
- (b) severing from the strip the length bearing the indicating means; and
- (c) combining said several length with said segments to identify the information recorded on said segments.

3. The method in accordance with claim 1 and further comprising:
- (a) spacing at uniform intervals along the strip
  - (1) the recorded patterns, and
  - (2) the points of severance intermediate the ends of said patterns;
- (b) whereby said sagments are of equal length and each segment has recorded thereon at least parts of two separately distinguishable patterns which match complementary parts of such patterns carried by other of said segments.

4. The method in accordance with claim 3 and further comprising:
- (a) arranging the severed segments in a side by side relation while maintaining continuity in the complementary parts of said patterns on the segments.

5. The method in accordance with claim 4 and further comprising:
- (a) recording on a length of the strip of material indicating means for identifying the information included in the ordered file;
- (b) severing the length bearing the indicating means from the strip of material; and
- (c) positioning said severed length in an identifying location relative to the side by side arranged severed segments.

6. A method for preparing an ordered file from existing records, which comprises:
- (a) recording on a strip of material
  - (1) indicating means for identifying the records included in the file,
  - (2) a plurality of separately distinguishable patterns, the first pattern following the indicating means, and the other patterns being uniformly spaced along said strip, and
  - (3) the records forming the file, different groups each comprising a preselected number of records being recorded between the uniformly spaced patterns, and each of said records within each group being recorded on distinct uniform lengths of said strip;
- (b) transversely severing the strip into segments of uniform length at points intermediate the ends of each recorded pattern so that complementary parts of each severed pattern are carried by distinct segments; and
- (c) arranging the severed segments in a side by side relation while maintaining continuity in the complementary parts of said patterns on the segments,
- (d) whereby the ordered file is arranged in sheet form and is comprised of recorded records in a plurality of rows in each of two substantially perpendicular directions.

7. A method for preparing from existing records an ordered file on a photosensitive strip, which method comprises:
- (a) positioning successive uniform lengths of the photosensitive strip in a photographing station;
- (b) directing onto said strip, images of
  - (1) the records forming the file, in timed sequence to the movement of said lengths into said photographing station so that each record image is recorded on a unique length of strip, and in groups spaced along said strip by at least one of said lengths, the groups each comprising a preselected number of distinct record images, and
  - (2) visually distinct patterns, uniformly spaced along said strip and located on said lengths between the groups of record images;
- (c) processing the photosensitive strip to produce visible records and patterns on said strip;
- (d) severing the strip into segments of uniform length at points intermediate the ends of each recorded pattern; and
- (e) arranging the severed segments in a side by side relation while maintaining continuity in the complementary parts of said patterns on the segments.

8. A method for preparing an ordered file having an index system for locating information therein comprising:
- (a) recording at uniform longitudinally spaced intervals along a strip of material, a predetermined sequence of separately distinguishable patterns, each pattern identifying the portion of said strip on which it is respectively recorded;

(b) recording between said patterns selected groups of information which are to form the file;

(c) transversely severing the strip at points located along the longitudinal dimension of each of said patterns so as to form segments of equal length each having portions of two different patterns respectively on the ends thereof;

(d) arranging said segments in a juxtaposed relation with one longitudinal side only, of those segments having complementary patterns, being contiguous;

(e) whereby the patterns provide a means for arranging said ordered file, for verifying the integrity of said ordered file and for locating information within the ordered file according to said predetermined sequence.

References Cited by the Examiner

UNITED STATES PATENTS

| | | | |
|---|---|---|---|
| 1,889,575 | 11/1932 | Sebille | 88—24 |
| 2,026,500 | 12/1935 | Hutchings | 96—27 |
| 2,284,776 | 6/1942 | Stuart | 88—24 |
| 2,701,979 | 2/1955 | Pratt | 88—24 |
| 2,761,351 | 9/1956 | Gehring | 88—24 |
| 2,903,808 | 9/1959 | Anderson | 40—158 |

JOHN M. HORAN, *Primary Examiner.*